United States Patent
Matsunaga et al.

(10) Patent No.: US 12,085,519 B2
(45) Date of Patent: Sep. 10, 2024

(54) LOOSENING DETECTION STRUCTURE AND LOOSENING DETECTION METHOD USING SAID STRUCTURE

(71) Applicant: Nippon Telegraph and Telephone Corporation, Tokyo (JP)

(72) Inventors: Eri Matsunaga, Musashino (JP); Tadashi Minotani, Musashino (JP); Masahito Nakamura, Musashino (JP); Masayuki Tsuda, Musashino (JP); Takashi Sawada, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 369 days.

(21) Appl. No.: 17/614,660

(22) PCT Filed: May 30, 2019

(86) PCT No.: PCT/JP2019/021473
§ 371 (c)(1),
(2) Date: Nov. 29, 2021

(87) PCT Pub. No.: WO2020/240765
PCT Pub. Date: Dec. 3, 2020

(65) Prior Publication Data
US 2022/0228996 A1   Jul. 21, 2022

(51) Int. Cl.
*G01N 22/02* (2006.01)
*G01N 27/22* (2006.01)

(52) U.S. Cl.
CPC .......... *G01N 22/02* (2013.01); *G01N 27/226* (2013.01)

(58) Field of Classification Search
CPC ... G01L 5/24; G01L 5/243; G01L 1/14; G01L 1/142; G01N 22/00; G01N 22/02; G01N 27/226; F16B 31/02–028; G01D 5/24; G01R 27/2605
See application file for complete search history.

(56) References Cited

U.S. PATENT DOCUMENTS

| | | | |
|---|---|---|---|
| 9,410,860 B2 * | 8/2016 | Shea | G01L 1/142 |
| 9,483,674 B1 * | 11/2016 | Fink | G06K 7/10366 |
| 10,788,384 B1 * | 9/2020 | Chen | G01L 1/14 |
| 2022/0268599 A1 * | 8/2022 | Matsunaga | F16B 31/02 |

FOREIGN PATENT DOCUMENTS

| JP | 2004-133082 A | 4/2004 |
|---|---|---|
| JP | 2013-210234 A | 10/2013 |

OTHER PUBLICATIONS

Xiangxiong Kong et al., *Image Registration-Based Bolt Loosening Detection of Steel Joints*, Sensors, vol. 18, No. 4, 2018, pp. 1-20.

* cited by examiner

Primary Examiner — Judy Nguyen
Assistant Examiner — James Split
(74) Attorney, Agent, or Firm — Workman Nydegger

(57) ABSTRACT

A looseness detection structure includes: a structure (transducer) T which is formed on a surface of a cable; a screw which tightens and fixes the cable in contact with the structure T; and a terminal (detection unit) which transmits a transmission signal to the structure T, receives a reception signal returning after propagating through the structure T, and detects the loosening of the screw based on a change in the reception signal.

6 Claims, 15 Drawing Sheets

LOOSENING DETECTION STRUCTURE AND LOOSENING DETECTION METHOD USING SAID STRUCTURE

TECHNICAL FIELD

The present disclosure relates to a technique for detecting loosening, falling, or the like of a screw for fixing a cable.

BACKGROUND ART

Screws and bolts have spiral grooves used for tightening parts and are used for various purposes from large equipment such as infrastructures and plant equipment to familiar products such as vehicles, playground equipment, and furniture. At a bolt joint, loosening or falling may occur due to deterioration such as plastic deformation and fatigue caused by vibration and excessive force. Due to these factors, for example, personal injury caused by bridge collapse or collapse accidents, leakage of gas/liquid from joints, disconnection of roller coaster axles, and dropping of bolts from high places may occur. In order to solve the above-described problems, there is a method of marking a bolt and visually inspecting a deviation from a matching mark with a camera or a tapping sound inspection method.

CITATION LIST

Non Patent Literature

Non Patent Literature 1: Xiangxiong Kong and Jian Li, "Image Registration-Based Detection of Steel Joints," Sensors 2018, 18, 1000; doi: 10.3390/s18041000

SUMMARY OF THE INVENTION

Technical Problem

However, the method of marking a bolt and visually inspecting a deviation from a matching mark with a camera or the tapping sound inspection method is not suitable for blind spots, dark places, or places where visual inspection is difficult because of distance. For example, communication equipment includes equipment with many blind spots such as bridge attachment equipment and steel towers and equipment with concealing parts such as manholes, handholes, and closures. Further, these kinds of equipment are usually inspected with the eyes and are not easily inspected by an inexperienced person, and in this method, there are large individual differences in inspection results.

The present disclosure has been made in view of the above-described problems and an object thereof is to provide a looseness detection structure that easily and accurately detects loosening, falling, or the like of a screw for fixing a cable in a remote place and a looseness detection method using the structure.

Means for Solving the Problem

In order to solve the above-described problems, a looseness detection structure according to the present disclosure includes: a structure which is formed on a surface of a cable; a screw configured to tighten and fix the cable in contact with the structure; and a detection unit configured to transmit a transmission signal to the structure, receive a reception signal returning after propagating through the structure, and detect loosening of the screw based on a change in the reception signal.

Further, a looseness detection method according to the present disclosure includes: forming a structure on a surface of a cable; a detection unit tightening and fixing the cable with a screw while in contact with the structure; transmitting a transmission signal to the structure; the detection unit receiving a reception signal returning after propagating through the structure; and the detection unit detecting loosening of the screw based on a change in the reception signal.

Effects of the Invention

According to the present disclosure, it is possible to provide a looseness detection structure that easily and accurately detects loosening, falling, or the like of a screw for fixing a cable in a remote place and a looseness detection method using the structure.

DESCRIPTION OF EMBODIMENTS

Hereinafter, embodiments of the present disclosure will be described in detail with reference to the drawings. However, it should be noted that the drawings are schematic and a relationship between a thickness and a planar dimension and the like of components are different from those in reality. Of course, portions having different mutual dimensional relationships or ratios are also included in the plurality of drawings.

Overview

A looseness detection structure according to an embodiment of the present disclosure and a looseness detection method using the structure are for easily and accurately detecting loosening, falling, or the like (hereinafter, simply referred to as "loosening") of a screw for fixing a cable in a remote place. For example, a sheet is attached to a cable or paint is applied to the cable at a position to be detected to create a transducer and an electrical signal is caused to flow to the sheet or coating to acquire an electric change amount. Thus, it is possible to easily and accurately detect a change in an electric characteristic due to the loosening, falling, or the like of the screw in a remote place.

Basic Configuration

Figure 1:
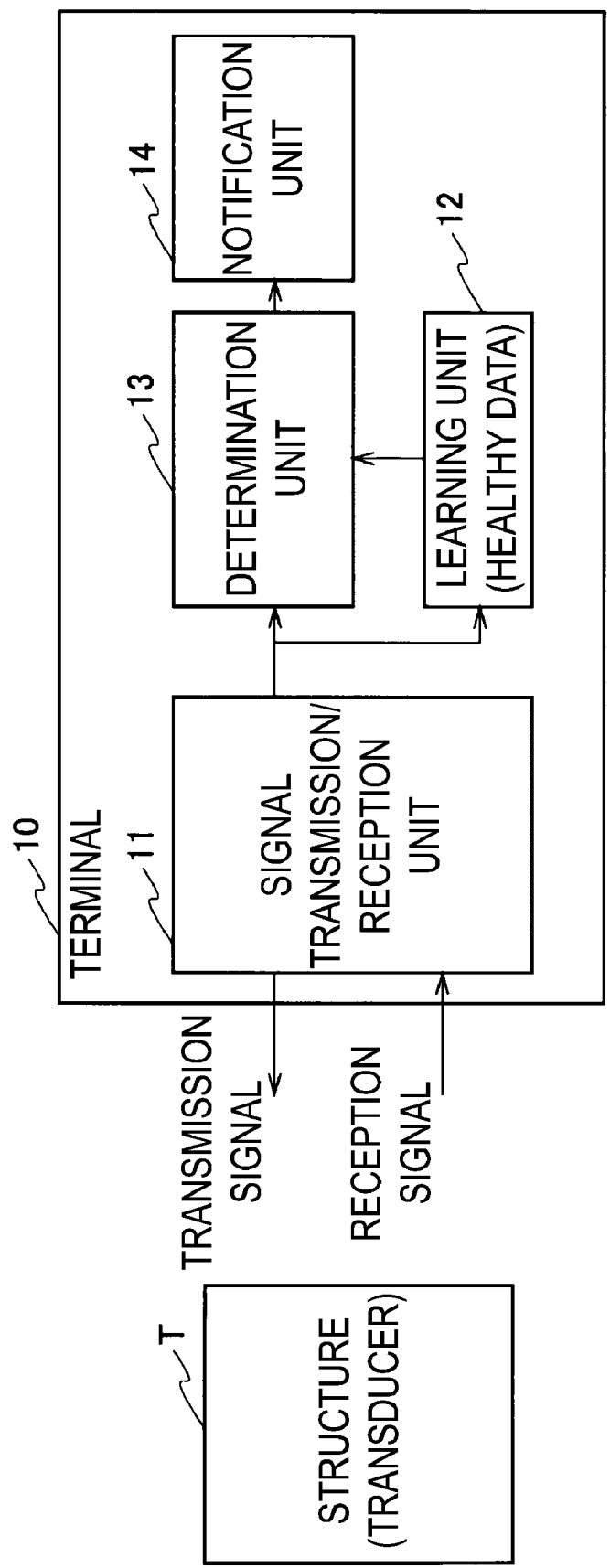
FIG. 1 is a functional block diagram of a looseness detection structure according to an embodiment of the present disclosure.

FIG. 1 is a functional block diagram of a looseness detection structure according to an embodiment of the present disclosure. This looseness detection structure is a looseness detection structure that detects loosening, falling, or the like of a screw for fixing a cable and includes a structure T, a screw (not shown), and a terminal 10. The structure T is a transducer which is formed on a surface of a cable and is a structure capable of propagating a signal. The structure T is fixed to the cable by the screw according to the method to be described later. The terminal 10 is a detection unit which transmits a transmission signal (electromagnetic waves) to the structure T, receives a reception signal (reflected waves, transmitted waves, etc.) that returns after propagating through the structure T, and detects the loosening of the screw based on a change in the reception signal. Signals may be transmitted and received between the structure T and the terminal 10 in a wired manner or a wireless manner. The place where the terminal 10 is installed may be any place where signals can be transmitted to and received from the structure T in a wired manner or a wireless manner.

The terminal 10 includes, for example, a signal transmission/reception unit 11, a learning unit 12, a determination unit 13, and a notification unit 14. The signal transmission/reception unit 11 transmits a transmission signal to the structure T and receives a reception signal returning from the structure T. The learning unit 12 stores data of the reception signal received when there is no looseness of the screw. The determination unit 13 detects (determines) the loosening of the screw based on the data stored in the learning unit 12. The notification unit 14 outputs abnormality information when the loosening of the screw is detected. Each of these components may be configured as hardware such as an electronic circuit or may be configured as a software program. Further, such a program may be pre-recorded on a computer-readable recording medium or may be supplied via a network such as the Internet.

Basic Operation

Figure 2:
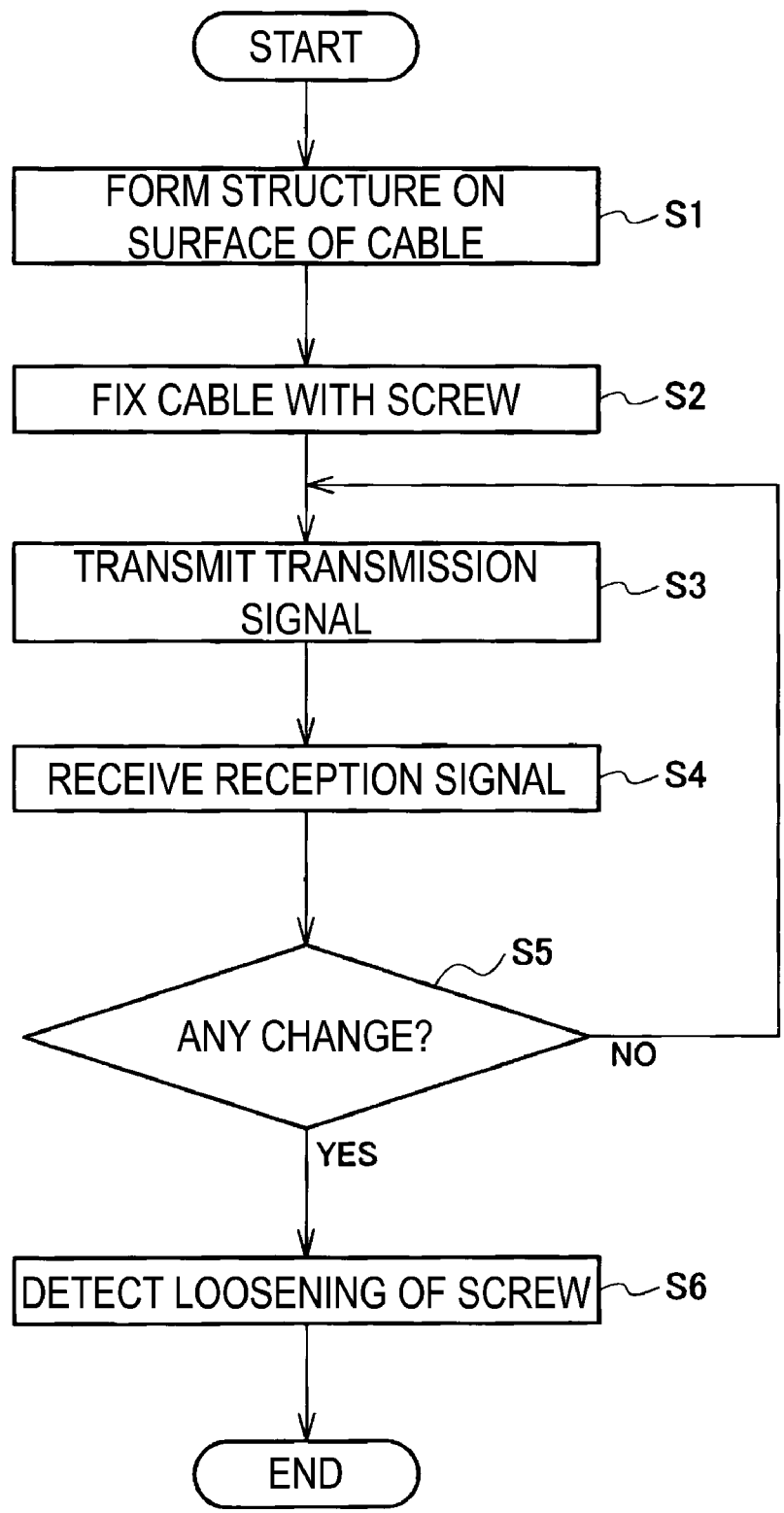
FIG. 2 is a flowchart showing a looseness detection operation according to the embodiment of the present disclosure.

FIG. 2 is a flowchart showing a looseness detection operation according to the embodiment of the present disclosure. As shown in FIG. 2, the structure T is first formed on the surface of the cable (step S1). Next, the cable is tightened and fixed with the screw while in contact with the structure T (step S2). Thus, the terminal 10 transmits a transmission signal to the structure T, receives a reception signal returning after propagating through the structure T, and detects the loosening of the screw based on a change the reception signal (step S3 to step S6). It is also possible to provide a notification when the loosening of the screw is detected.

First Embodiment

Hereinafter, a first embodiment will be described. In the first embodiment, an example (reflection measurement) of simultaneously monitoring two upper and lower screws will be described.

Figure 3:
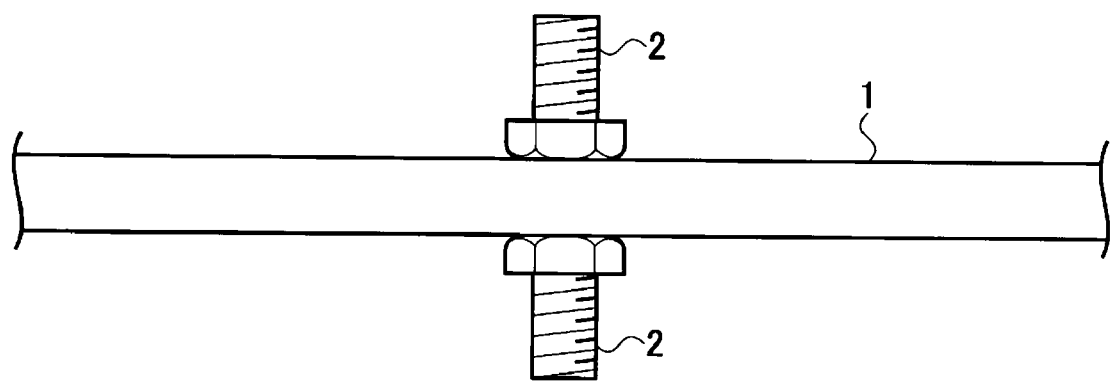
FIG. 3 is a view showing a method of fixing a cable according to a first embodiment.

FIG. 3 is a view showing a method of fixing a cable 1 according to the first embodiment. As shown in FIG. 3, the cable 1 such as an ordinary optical fiber cable is fixed by tightening the upper and lower portions with the screws 2.

Figure 4:
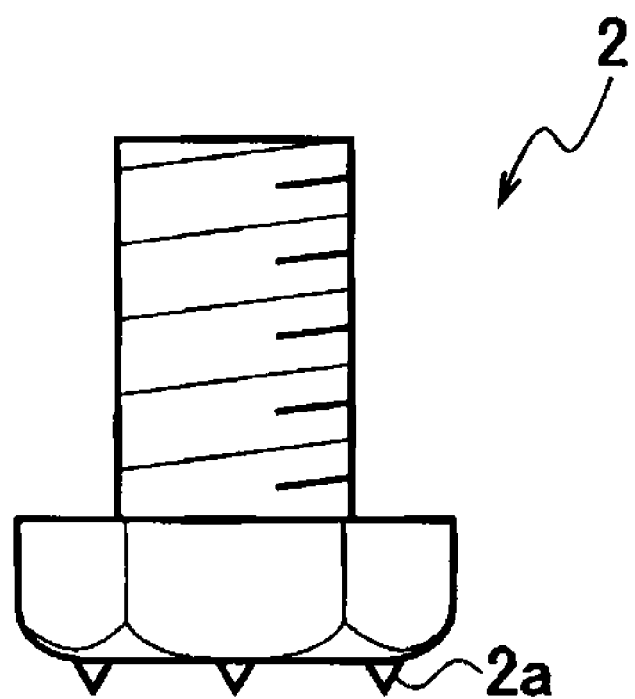
FIG. 4 is an enlarged view of a screw shown in FIG. 3.

FIG. 4 is an enlarged view of the screw 2 shown in FIG. 3. The screw 2 is often provided with a protrusion shown in FIG. 4 in order to tighten the cable 1. Hereinafter, the screw 2 is assumed to be a metal screw, but may be a resin screw coated with a conductive material.

Figure 5:
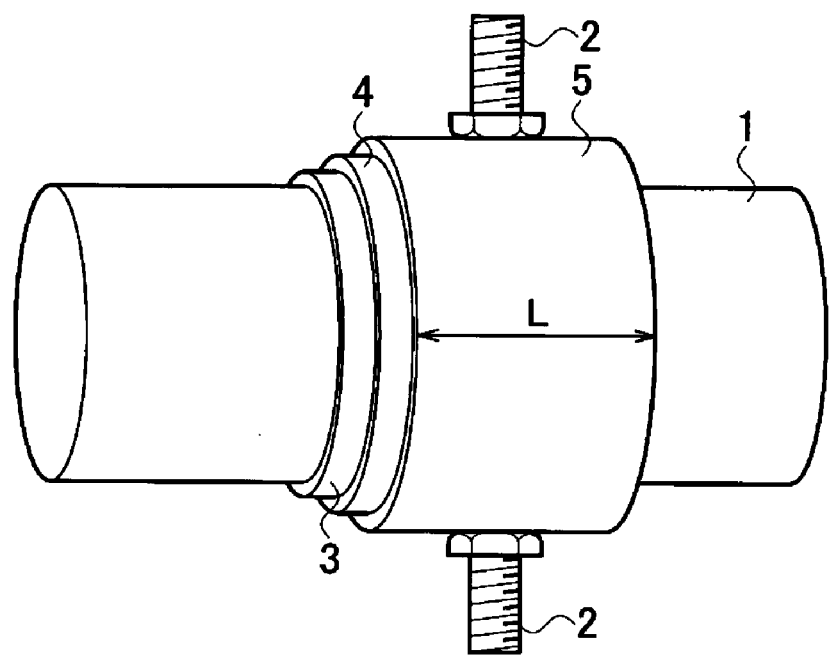
FIG. 5 is an external view of a looseness detection structure according to the first embodiment.

FIG. 5 is an external view of the looseness detection structure according to the first embodiment. This looseness detection structure is obtained by forming a sheet or coating (transducer) on the cable 1 as will be described below.

First, a conductive sheet 3 is installed on the outer skin of the cable and an insulating sheet 4 is installed thereon in this order because the cable 1 such as an ordinary optical fiber cable has an insulating property. Both the conductive sheet 3 and the insulating sheet 4 may be set or laminated and attached. Further, a conductive paint and an insulating paint having a predetermined length and film thickness may be applied to the cable 1 instead of the sheet. In the drawings, for clarity of description, the conductive sheet 3 and the insulating sheet 4 are depicted to have a noticeable step, but may not be installed without the step. The conductive sheet 3 and the insulating sheet 4 having the same size can be used. It is preferable that the conductive sheet 3 and the insulating sheet 4 be of a seal type so that the close contact with the cable 1 does not disappear even when the screw 2 is loosened.

Next, a conductive sheet 5 is installed on the insulating sheet 4. It is preferable that this conductive sheet 5 be formed of a harder material harder than the conductive sheet 3. The terminal 10 detects the loosening of the screw 2 using a phenomenon in which the conductive sheet 5 is separated from the insulating sheet 4 when the screw 2 is loosened. For this reason, it is preferable that an adhesive or the like not be applied to the entire sheet surface between the conductive sheet 5 and the insulating sheet 4. An adhesive may be partially used in the conductive sheet 5 so that the conductive sheet 5 is not displaced from the insulating sheet 4. The horizontal width L of the conductive sheet 5 is preferably larger than a head portion of the screw 2 to be detected, but is adjusted to an appropriate size because the resonance manner to be described changes when the horizontal width is too large.

Figure 6:
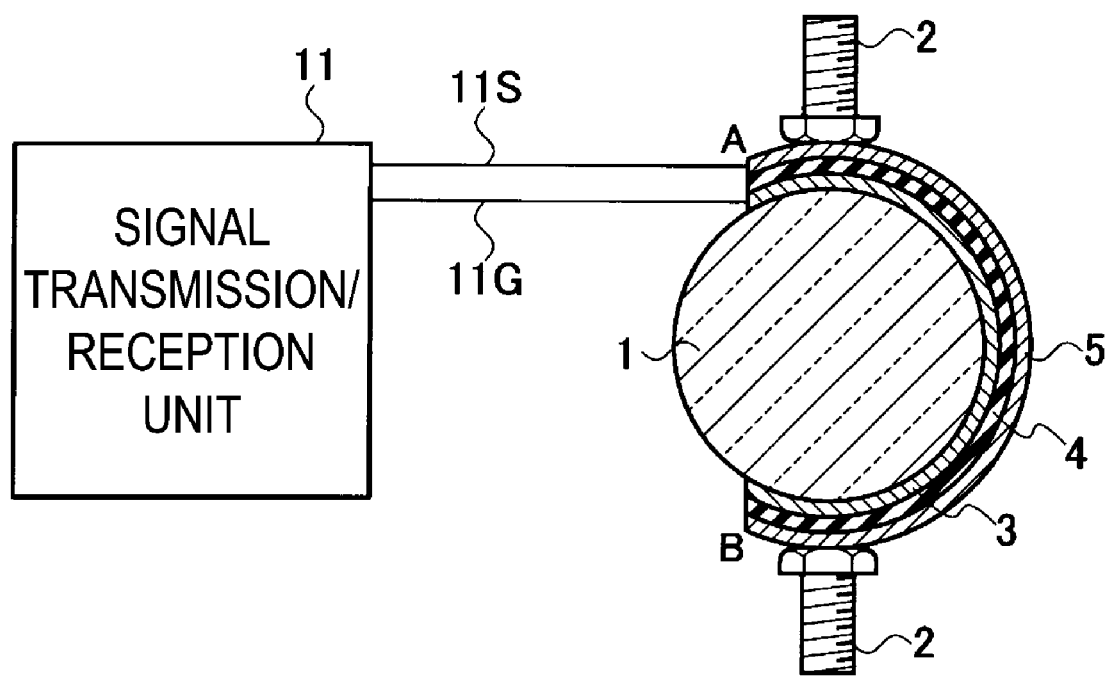
FIG. 6 is a cross-sectional view of the looseness detection structure according to the first embodiment.
Figure 7:
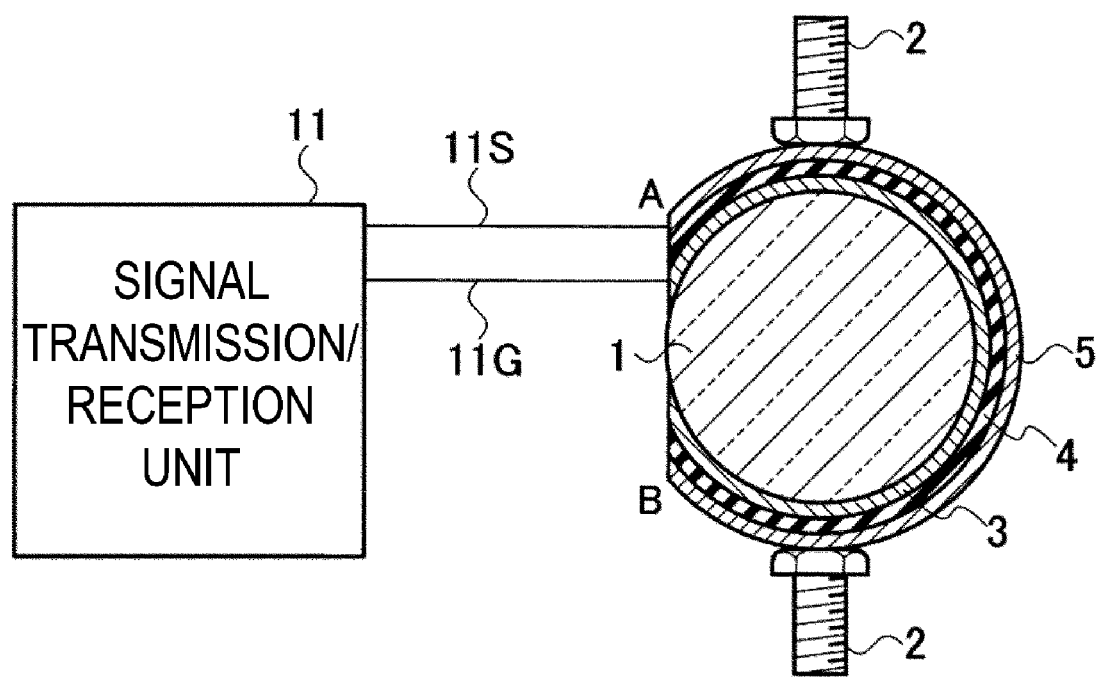
FIG. 7 is a cross-sectional view of the looseness detection structure according to the first embodiment.
Figure 8:
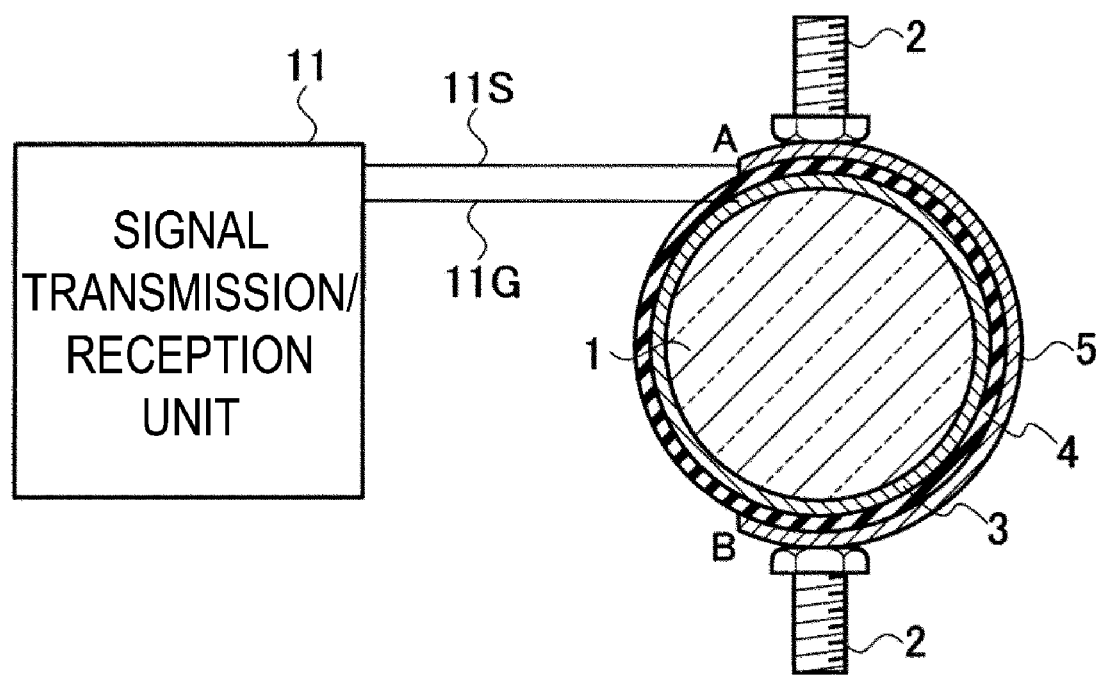
FIG. 8 is a cross-sectional view of the looseness detection structure according to the first embodiment.

FIGS. 6 to 8 are cross-sectional views of the looseness detection structure according to the first embodiment. However, it should be noted that the drawings are schematic and details (for example, the end portions of the conductive sheet 3, the insulating sheet 4, and the conductive sheet 5, etc.) are different from those in reality.

FIGS. 6 to 8 show a state in which two upper and lower screws 2 are fixed to the cable 1 in each of the drawings. The conductive sheet 3 is connected to a ground line 11G, the conductive sheet 5 is connected to a signal line 11S, and the ground line 11G and the signal line 11S are connected to the signal transmission/reception unit 11. In these drawings, only the signal transmission/reception unit 11 in the terminal 10 is depicted, but other components are also provided. The conductive sheet 3, the insulating sheet 4, and the conductive sheet 5 may cover the half circumference of the cable 1 as shown in FIG. 6 or may cover the periphery of the cable 1 as shown in FIG. 7. However, the screw 2 to be detected needs to be installed in contact with the conductive sheet 5. The terminal 10 detects the loosening of the screw 2 using a phenomenon in which the conductive sheet 5 is separated from the insulating sheet 4 when the screw 2 is loosened. For this reason, the shape of the conductive sheet 5 may not be a shape that covers all of the circumference of the cable 1, but preferably may be a shape which is not partially connected like the letter C of the alphabet. For example, as shown in FIG. 8, all of the circumference of the cable 1 may be covered by the conductive sheet 3 and the insulating sheet 4 and only the conductive sheet 5 may have the shape of the letter C of the alphabet.

Figure 9:
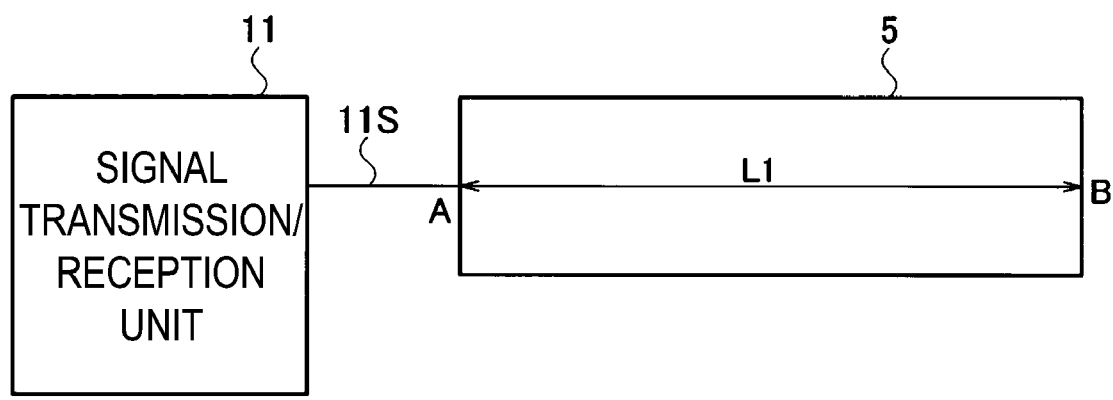
FIG. 9 is a schematic view of the looseness detection structure shown in FIG. 6.

FIG. 9 is a schematic view of the looseness detection structure shown in FIG. 6. That is, when the terminal 10 applies an alternating voltage to the conductive sheet 3 and the conductive sheet 5 in a state in which the screw 2 is fixed to the cable 1 as shown in FIG. 9, a resonance characteristic is observed in which the length L1 between both ends of A to B of the conductive sheet 5 is taken as the resonance length. The lowest first harmonic α is a frequency at which L1 resonates at the half wavelength λ/2. λ is a wavelength in the medium. The second harmonic β is a frequency at which L1 resonates at λ that is twice λ/2. In this way, a resonance occurs at a resonance frequency where L1 is an integer multiple of λ/2.

Figure 10:
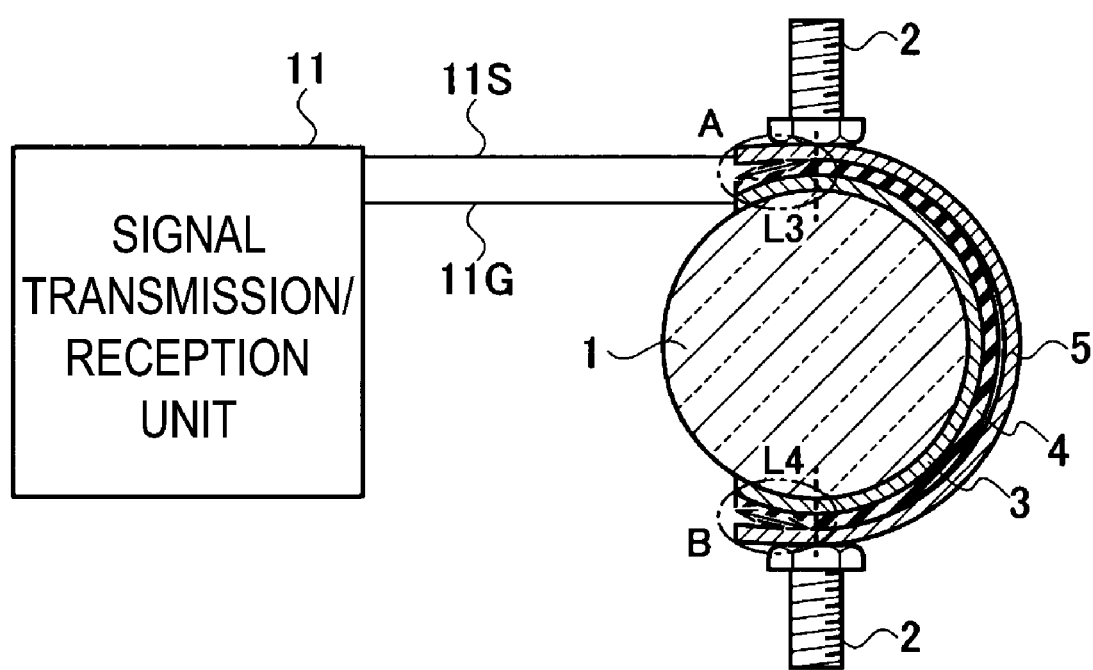
FIG. 10 is a cross-sectional view of the looseness detection structure according to the first embodiment.
Figure 11:
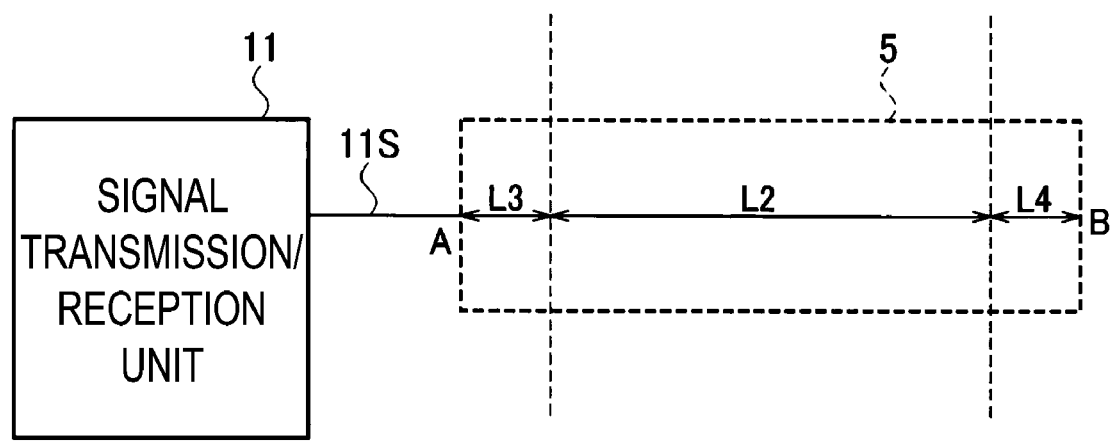
FIG. 11 is a schematic view of the looseness detection structure shown in FIG. 10.

FIG. 10 is a cross-sectional view of the looseness detection structure according to the first embodiment and FIG. 11 is a schematic view thereof. Here, FIG. 10 shows a state in which the screw 2 fixed to the upper and lower sides is loosened. When the screw 2 is loosened, the effect of trapping the electromagnetic waves flowing into the insulating sheet 4 by the conductive sheet 5 is reduced, so that the electric field strength of the insulating sheet 4 at the points A and B decreases. Thus, as shown in FIG. 11, a resonance characteristic is observed in which the length of L2 that is shortened from L1 by the length (L3 and L4) of a portion not in contact with the insulating sheet 4 and the conductive sheet 5 is taken as the resonance length. As in the case in which the screw is fixed, a resonance occurs at a resonance frequency where L2 is an integer multiple of λ/2 even when the screw is loosened. For that reason, the loosening of the screw 2 can be detected in such a manner that the terminal 10 monitors a change in the resonance frequency.

As described above, in the first embodiment, it is assumed that the cable 1 covered by the insulating covering is clamped and fixed by the conductive screw 2. In such a case, a laminated structure of the conductive sheet 3, the insulating sheet 4, and the conductive sheet 5 is formed on the surface of the cable covering. The screw 2 is electrically connected to the conductive sheet 5, the conductive sheet 3 is connected to the ground line 11G, the conductive sheet 5 is connected to the signal line 11S, and the ground line 11G and the signal line 11S are connected to the signal transmission/reception unit 11.

In operation, the signal transmission/reception unit 11 generates electromagnetic waves and the electromagnetic waves reach a detection object via the signal line 11S and the ground line 11G. At this time, because the resonance frequency of the electromagnetic waves shifts when the screw 2 is tightened and when the screw is loosened, the loosening of the screw 2 can be detected. With this technique, it is possible to provide the looseness detection structure suitable for inspecting the loosening or falling of the screw 2 clamping the cable 1 in an unobservable or remote place and the looseness detection method using the structure.

Second Embodiment

Hereinafter, a second embodiment will be described with focus on the differences from the first embodiment. In the second embodiment, an example (reflection measurement) of monitoring one screw 2 will be described.

Figure 12:
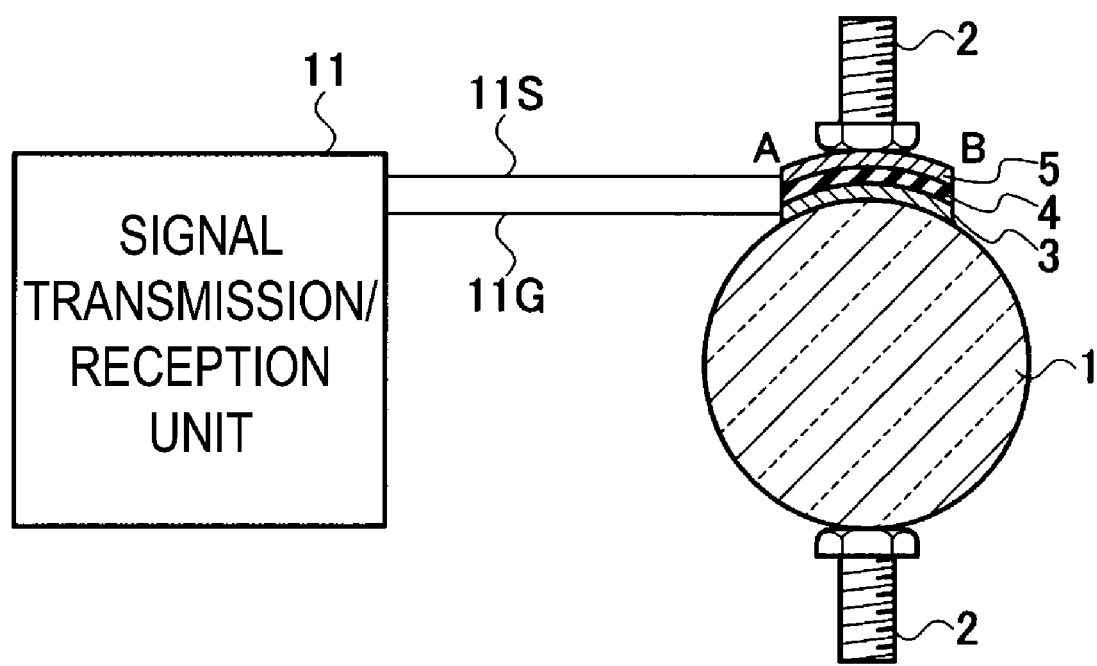
FIG. 12 is a cross-sectional view of a looseness detection structure according to a second embodiment.

FIG. 12 is a cross-sectional view of a looseness detection structure according to the second embodiment. Here, a state in which two upper and lower screws 2 are fixed to the cable 1 is shown. As shown in FIG. 12, when the loosening of the upper screw 2 is monitored, only one screw 2 may be installed in contact with the conductive sheet 5. It is preferable that the screw 2 and the conductive sheet 5 be attached to each other so that they are not separated even if the screw 2 is loosened. In this way, in a state in which the screw 2 is fixed, a resonance characteristic having AB of the conductive sheet 5 as both ends is observed.

Figure 13:
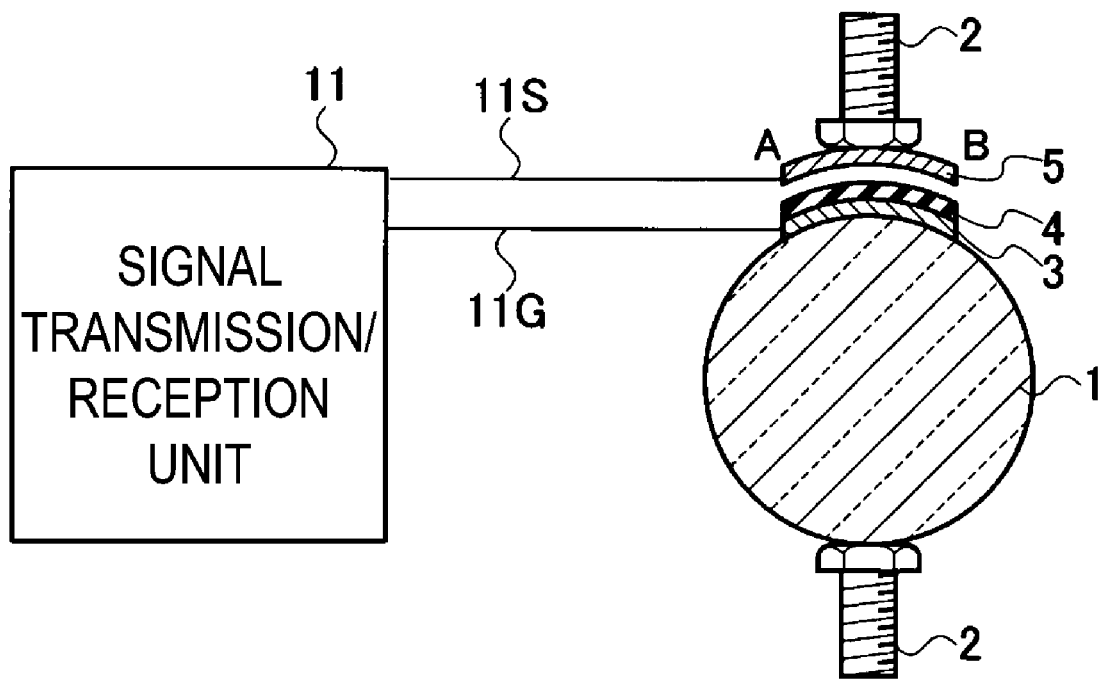
FIG. 13 is a cross-sectional view of the looseness detection structure according to the second embodiment.

FIG. 13 is a cross-sectional view of the looseness detection structure according to the second embodiment. Here, a state in which the screw 2 fixed to the upper side is loosened is shown. As shown in FIG. 13, when the screw 2 is loosened, a space is formed between the conductive sheet 5 and the insulating sheet 4, so that the electromagnetic waves are not trapped and the electric field strength of the insulating sheet 4 decreases. Thus, the resonance frequency cannot be observed or the Q value of the observed resonance frequency decreases and shifts to the high frequency side. For that reason, the loosening of the screw 2 can be detected in such a manner that the terminal 10 monitors a change in the resonance frequency.

As described above, in the second embodiment, one screw 2 can be monitored by the same method as in the first embodiment. Here, a case of monitoring the upper screw 2 has been described, but of course, the lower screw 2 may also be monitored.

Third Embodiment

Hereinafter, a third embodiment will be described with focus on the differences from the first or second embodiment. Here, an example of monitoring the loosening of the screw 2 by transmission measurement will be described.

Figure 14:
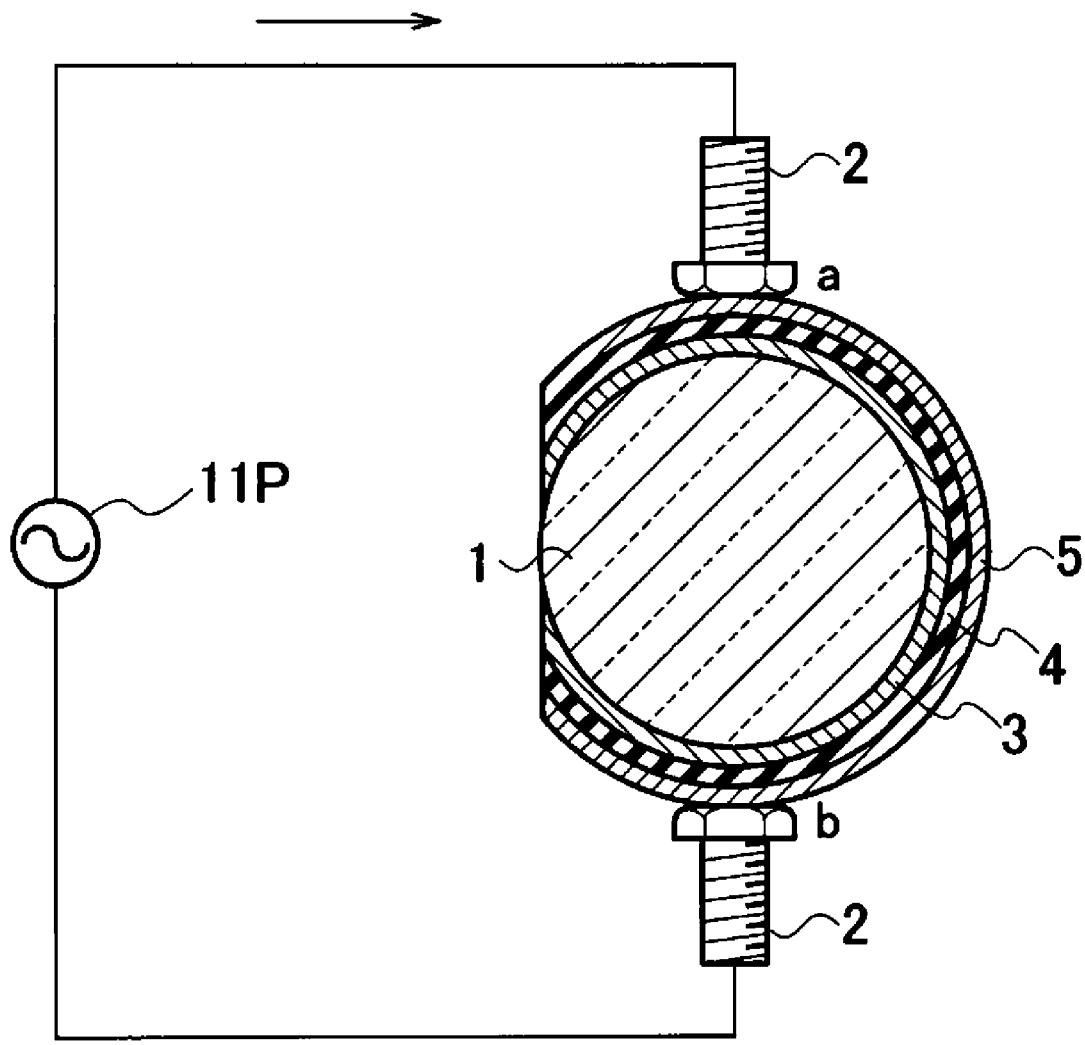
FIG. 14 is a cross-sectional view of a looseness detection structure according to a third embodiment.
Figure 15:
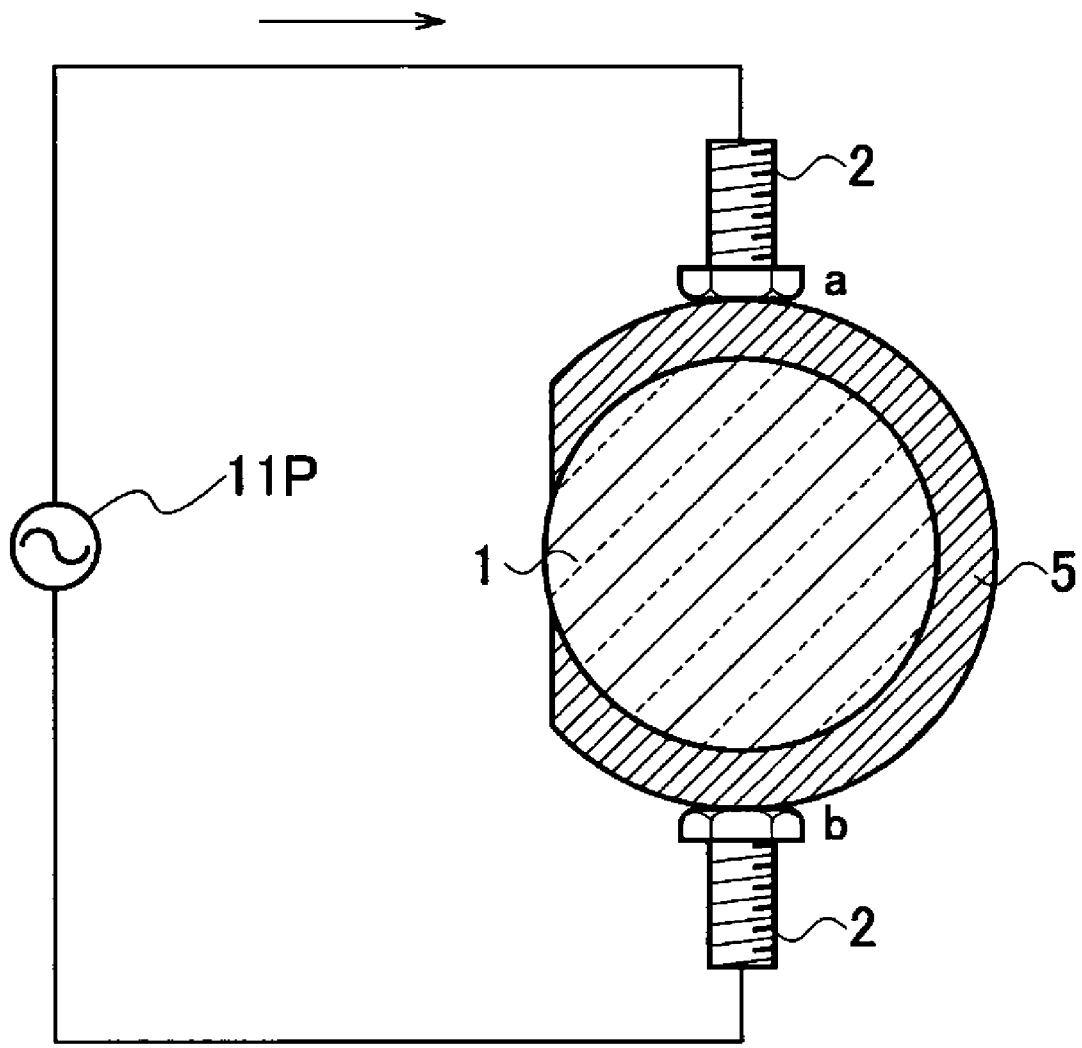
FIG. 15 is a cross-sectional view of the looseness detection structure according to the third embodiment.

FIGS. 14 and 15 are cross-sectional views of a looseness detection structure according to the third embodiment. As shown in FIG. 14, a three-layer structure similar to that of FIG. 6 is formed on the outer skin of the cable. The third embodiment is characterized in that the conductive sheet 5 is not physically movable because adhesive materials are used for the entire conductive sheet unlike the first or second embodiment. A power supply 11P in the drawing serves as a transmission function of the signal transmission/reception unit 11. The power supply 11P allows an alternating signal to flow between the contacts a and b of two screws 2 and the conductive sheet 5 and monitors the impedance between the contacts a and b. When the screw 2 is separated from the conductive sheet 5 from a state in which the screw 2 is in contact with the conductive sheet 5, the impedance increases and hence the loosening of the screw 2 can be detected. When this technique is used alone, the three-layer structure is not essentially required, and as shown in FIG. 15, only the conductive sheet 5 may be installed on the cable 1.

As described above, in the third embodiment, the loosening of the screw 2 can be monitored by transmission measurement. According to the third embodiment, there is a merit that the loosening of the screw 2 can be detected by a simple configuration compared to the first or second embodiment.

Characteristic Configuration and Effect

As described above, the looseness detection structure according to the embodiment of the present disclosure includes the structure (transducer) T which is formed on the surface of the cable 1, the screw 2 which tightens and fixes the cable 1 in contact with the structure T, and the terminal (detection unit) 10 which transmits a transmission signal to the structure T, receives a reception signal returning after propagating through the structure T, and detects the loosening of the screw 2 based on a change in the reception signal. Thus, it is possible to provide the looseness detection structure suitable for inspecting the loosening or falling of the screw 2 causing the falling of the cable 1.

Specifically, the structure T may be a three-layer structure in which the conductive sheet (the first conductive sheet) 3, the insulating sheet 4, and the conductive sheet (the second conductive sheet) 5 are laminated on the surface of the cable 1 in that order and the terminal 10 may allow electromagnetic waves to reach the conductive sheet 3 and the conductive sheet 5 and detect the loosening of the screw 2 based on a change in the resonance frequency of the electromagnetic wave. Thus, it is possible to inspect the loosening or falling of the screw 2 with high accuracy.

Further, the shape of the conductive sheet 5 may not be a shape that covers all of the circumference of the cable 1, but may be a C shape of which a part is not connected. Thus, the loosening can be detected using a phenomenon in which the conductive sheet 5 is separated from the insulating sheet 4 when the screw 2 is loosened.

Further, when the cable 1 is tightened and fixed with the two screws 2, at least one of the two screws 2 may be in contact with the conductive sheet 5. Thus, it is possible to detect the loosening of a specific screw 2 of two screws 2.

Further, the terminal 10 may allow an alternating signal to flow to the structure T via two screws 2 and detect the loosening of the screw 2 based on a change in impedance between the contacts a and b of two screws 2 and the structure T. Thus, the loosening of the screw 2 can be detected with a simple configuration.

Further, a looseness detection method according to the embodiment of the present disclosure includes: forming the structure T on the surface of the cable 1; tightening and fixing the cable 1 with the screw 2 while in contact with the structure T; transmitting a transmission signal to the structure T by the terminal 10; receiving a reception signal returning after propagating through the structure T by the terminal 10; and detecting the loosening of the screw 2 based on a change in the reception signal by the terminal 10. Thus, it is possible to provide the looseness detection method suitable for inspecting the loosening, falling, or the like of the screw 2 causing the falling of the cable 1.

Other Embodiments

As described above, although several embodiments have been described, it should be understood that the description and drawings which are parts of the disclosure are merely illustrative, and are not intended to limit the invention. From the disclosure, various alternative embodiments, examples, and operational techniques will be apparent to those skilled in the art. It is a matter of course that various embodiments and the like that are not described herein are also included in the present disclosure.

REFERENCE SIGNS LIST

1 Cable
2 Screw
3 Conductive sheet (first conductive sheet)
4 Insulating sheet
5 Conductive sheet (second conductive sheet)
10 Terminal (detection unit)
11 Signal transmission/reception unit
11S Signal line
11G Ground line
11P Power supply
12 Learning unit
13 Determination unit
14 Notification unit
T Structure

The invention claimed is:
1. A looseness detection structure comprising:
a structure which is formed on a surface of a cable;
at least one screw configured to tighten and fix the cable in contact with the structure; and
a detection unit configured to transmit a transmission signal to the structure, receive a reception signal returning after propagating through the structure, and detect loosening of the screw based on a change in the reception signal,
wherein the structure is a three-layer structure in which a first conductive sheet, an insulating sheet, and a second conductive sheet are laminated on the surface of the cable in that order, and
wherein the detection unit allows electromagnetic waves to reach the first conductive sheet and the second conductive sheet and detects the loosening of the screw based on a change in resonance frequency of the electromagnetic waves.

2. The looseness detection structure according to claim 1, wherein a shape of the second conductive sheet is not a shape that covers all of a circumference of the cable, but is a C shape that covers only a portion of the circumference of the cable.

3. The looseness detection structure according to claim 1, wherein the at least one screw includes two screws, wherein, when the cable is tightened and fixed with the two screws, at least one of the two screws is in contact with the second conductive sheet.

4. The looseness detection structure according to claim 1, wherein the at least one screw includes two screws, wherein the detection unit allows an alternating signal to flow to the structure through the two screws and detects the loosening of the screw based on a change in impedance between contacts of the two screws and the structure.

5. A looseness detection method comprising:
forming a structure on a surface of a cable;
tightening and fixing the cable with a screw, wherein the screw is in contact with the structure after being tightened and fixed;
a detection unit transmitting a transmission signal to the structure;
the detection unit receiving a reception signal returning after propagating through the structure, wherein the structure is a three-layer structure in which a first conductive sheet, an insulating sheet, a second conductive ta laminated on the surface of the cable in that order, and wherein the detection unit allows electromagnetic waves to reach the first conductive sheet and the second conductive sheet and detects the loosening of the screw based on a change in resonance frequency of electromagnetic waves; and
the detection unit detecting loosening of the screw based on a change in the reception signal.

6. The looseness detection structure according to claim 2, wherein the at least one screw includes two screws, wherein, when the cable is tightened and fixed with the two screws, at least one of the two screws is in contact with the second conductive sheet.

* * * * *